H. B. ROSS.
MOTOR TRUCK.
APPLICATION FILED MAY 11, 1914.

1,209,209.

Patented Dec. 19, 1916.
3 SHEETS—SHEET 1.

WITNESSES:
Clarence C. Cook
Frank H. Fowler

INVENTOR
Harry B. Ross
BY
Pierre Barnes
ATTORNEY

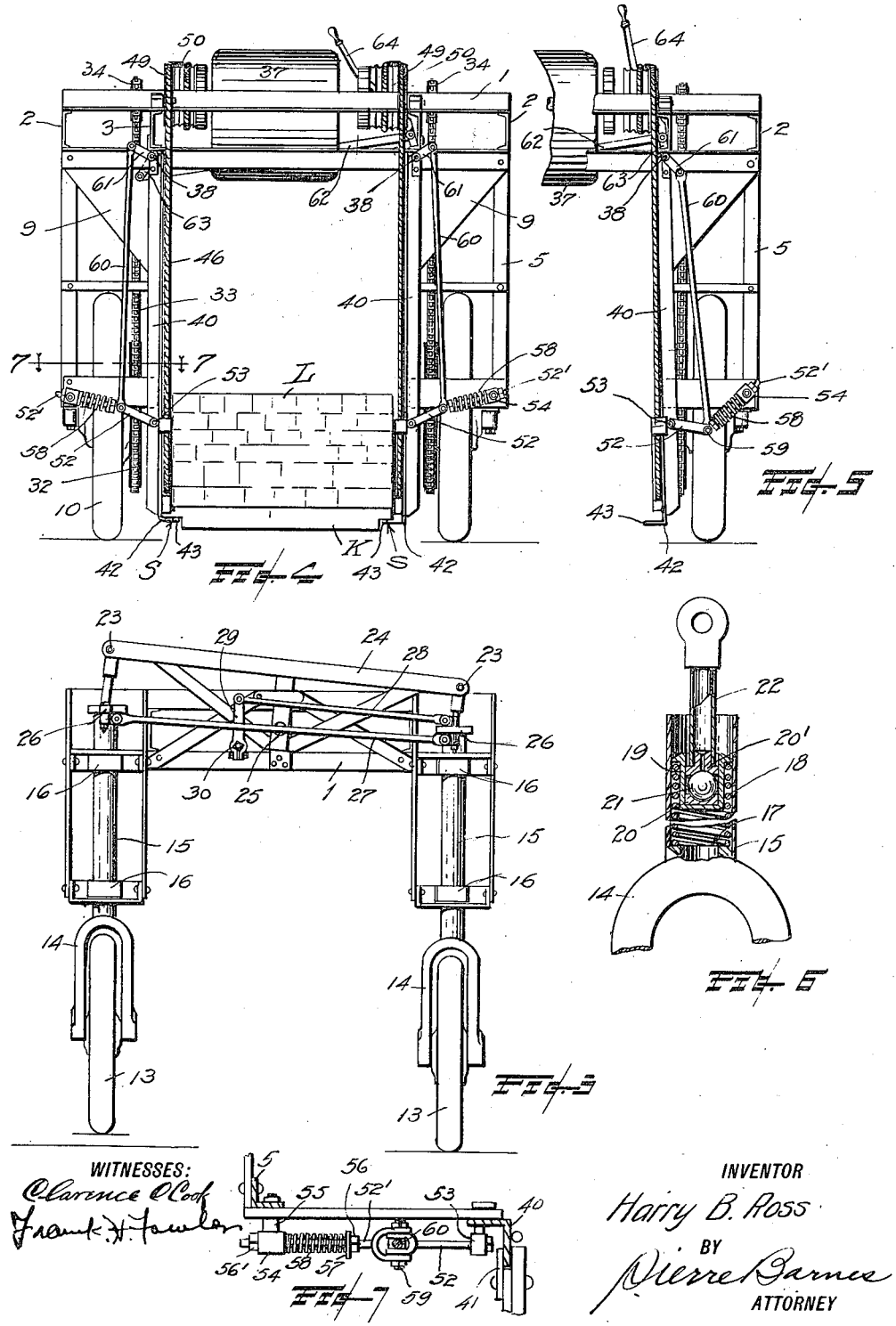

H. B. ROSS.
MOTOR TRUCK.
APPLICATION FILED MAY 11, 1914.

1,209,209.

Patented Dec. 19, 1916.
3 SHEETS—SHEET 3.

Witnesses
Frank N. Fowler
Clarence C. Cook.

Inventor
Harry B. Ross
By Pierre Barnes
Attorney

UNITED STATES PATENT OFFICE.

HARRY B. ROSS, OF SEATTLE, WASHINGTON.

MOTOR-TRUCK.

1,209,209.  Specification of Letters Patent.  Patented Dec. 19, 1916.

Application filed May 11, 1914. Serial No. 837,613.

*To all whom it may concern:*

Be it known that I, HARRY B. ROSS, a citizen of the United States, residing at Seattle, in the county of King and State of Washington, have invented certain new and useful Improvements in Motor-Trucks, of which the following is a specification.

This invention relates to improvements in motor trucks; and has mainly for its object the provision of a vehicle of this character which may be more conveniently and economically operated for the expeditious transportation of freight and, especially, of bulky articles such as lumber and rails.

More particularly, I aim to improve first, the general construction and arrangement of the vehicle body; second, the manner of mounting the same so that the load will be properly distributed among all the wheels without unduly straining the body when the vehicle is supported upon or traveling over rough surfaces; third, devices for grappling, elevating and depositing loads; and fourth, in certain details relating to the application of power for propelling the vehicle and actuating the load-handling devices.

The invention is illustrated in the accompanying drawings, in which—

Figure 1:
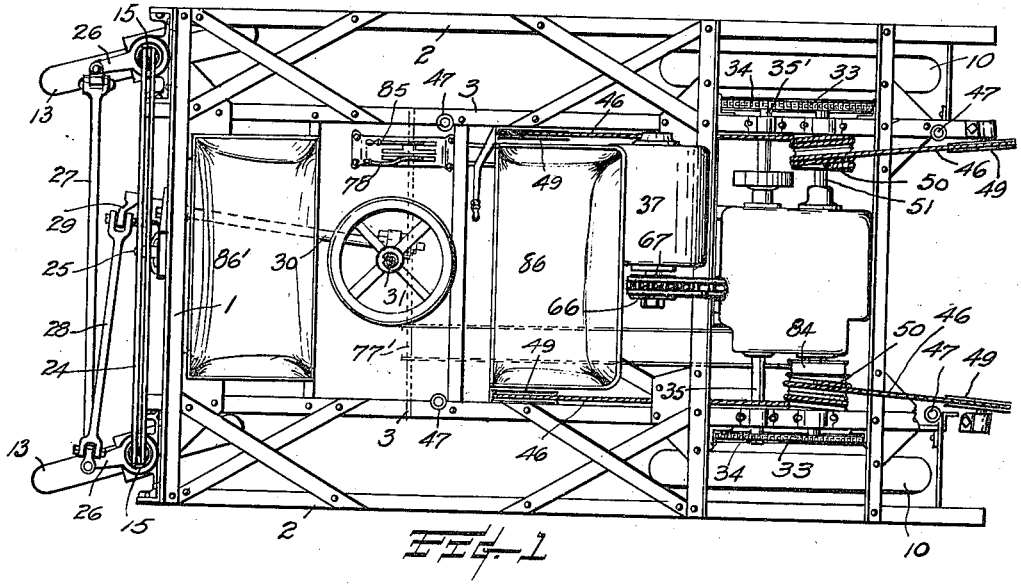
Figure 2:
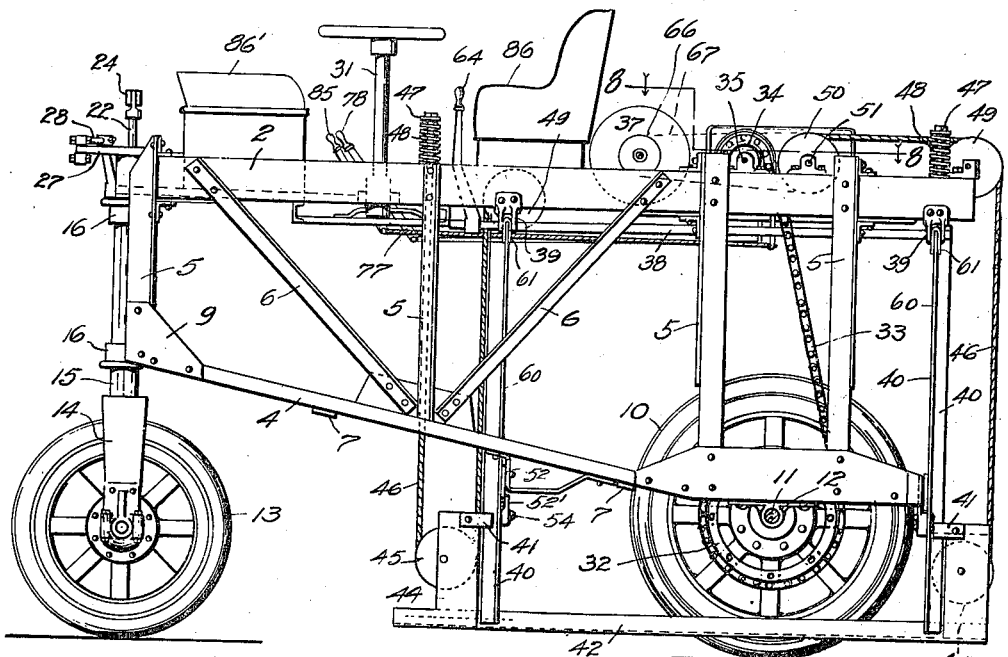
Figure 8:
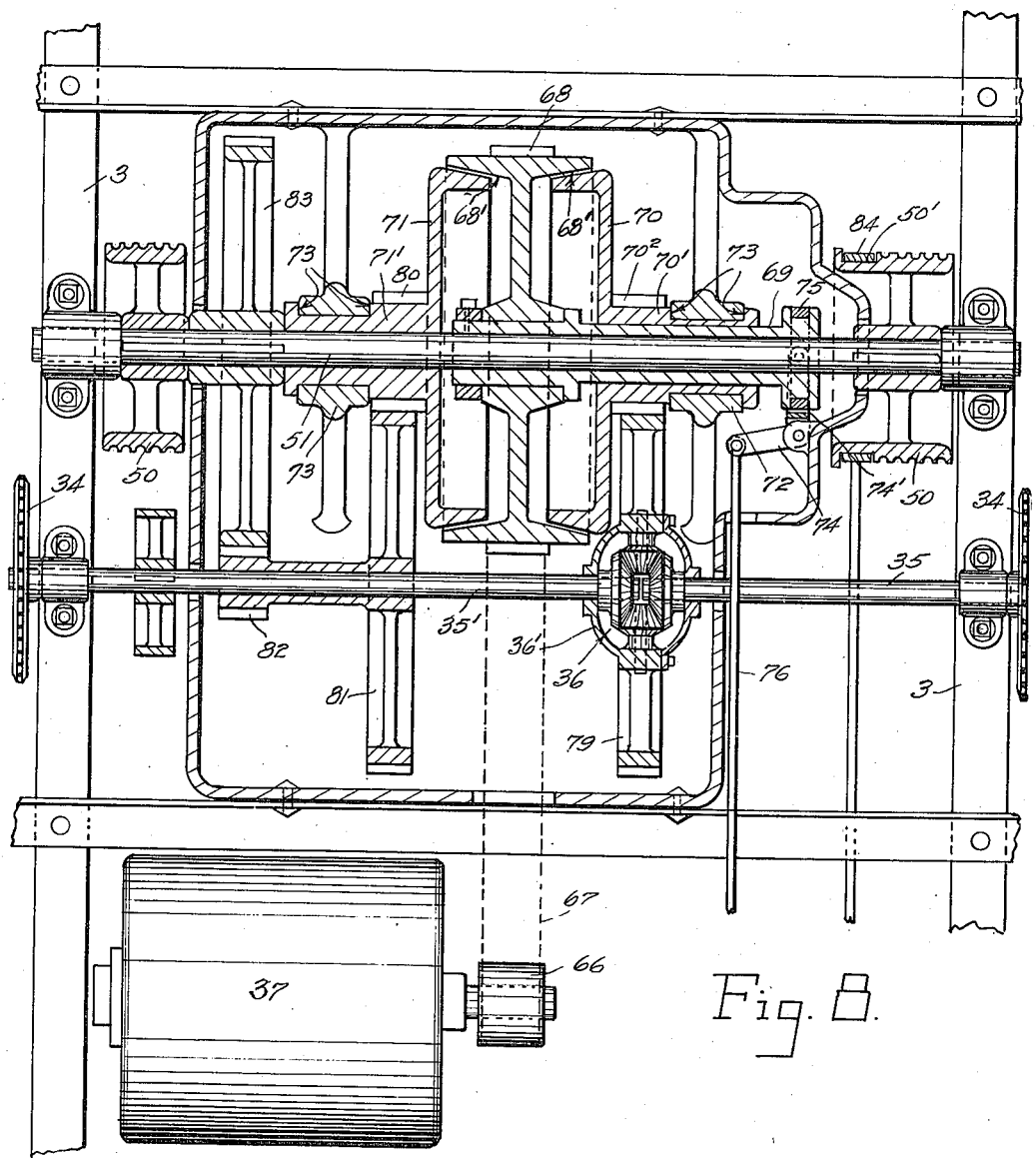

Figure 1 is a plan view of a motor-truck embodying my improvements. Fig. 2 is a side elevation of the same and with the near rear wheel omitted. Fig. 3 is a front end elevation. Fig. 4 is a rear end elevation with the grappling devices in operative positions. Fig. 5 is a fragmentary rear end elevation to illustrate the load-grappling devices in an inoperative position. Fig. 6 is a partly sectional front elevation of a front wheel support. Fig. 7 is a detail sectional view taken on line 7—7 of Fig. 4. Fig. 8 is a sectional view taken substantially through 8—8 of Fig. 2.

The body of the vehicle is provided with a rigid framework comprising transverse girder members 1, and pairs of longitudinal beams 2 and 3 disposed at each side to afford spaces therebetween. Each of said beams constitutes the upper chord of a truss, such as shown in Fig. 2, and whose lower chord member 4 is connected thereto by posts and braces 5 and 6. The lower chord members 4 of the trusses at each side are connected by tie-bars, as 7, but there are no connections between the lower portions of the trusses at one side with those at the other side of the vehicle.

The aforesaid frame elements are desirably of standard forms of structural steel such as angle-bars, channels, etc., and are rigidly secured together by rivets or an equivalent. To further stiffen the frame and properly distribute the strains to which it may be subjected, gusset-plates, as 9, may advantageously be utilized in the structure. The chord-members 4 are formed to have their forward ends inclined upwardly, as shown in Fig. 2. The rear or traction wheels 10 have their axles 11 journaled in bearing boxes 12 secured to the bottom chords of the referred to trusses. Each front wheel 13 has its axle journaled in bearings provided in the bifurcations 14 of a hollow post 15 which is mounted for rotary and axial movements in brackets 16 rigidly secured to the forward ends of the respective trusses.

Supported upon an annular shelf 17 adjacent the lower end and within a post 15 (Fig. 6) is a helical spring 18 which, in turn, supports a cylindrical box 19 containing superposed thrust-blocks 20 and $20^1$ with a ball 21 therebetween. The upper block $20^1$ is secured to the lower end of a tubular rod 22 which is connected at its upper end by a pivotal pin 23 (Fig. 3) with an arm of a transversely arranged rocker-beam, or equalizer, 24. Said equalizer is fulcrumed centrally of its length to a bolt 25 which protrudes from the forward end of the girder members 1. Through the agency of said springs and the equalizer, the front wheels are yieldingly held down against the ground and when either wheel is forced up, as in surmounting a high place in the road, it is opposed by the springs 18 of both wheels. In proximity to their upper ends said posts are provided with forwardly directed arms 26 which are coupled by a link 27, and a reach-rod 28 connects one of said arms with an arm 29 on a shaft 30, the latter being connected for oscillatory movements by suitable devices such as a gear and worm connection (not shown) with a steering post 31.

Mounted upon the axles 11 of or secured to the rear traction wheels 10 are sprocket wheels 32 which are driven by endless chains 33 from sprocket wheels 34 provided, respectively, on transversely arranged shafts 35 and $35^1$. These shafts are disposed in axial alinement and are coupled by suitable differential gearings, such as indicated by 36 (Fig. 8) and are driven from a motor 37 by power transmission devices, as will be presently described.

Included in the invention is apparatus for grappling and hoisting a load which is to be carried by the vehicle. To such ends, I provide longitudinal shafts 38 which are journaled for oscillatory movements about their axes in boxes 39 which depend from the frame beams 3. Loosely connected to and extending downwardly from the respective shafts 38 are angle bars 40 to which are attached, for vertical movements by guides 41, longitudinally disposed bars 42 having inwardly directed flanges 43 which serve as jaws for the load-grappling devices. The bars carry near the end of each a housing 44 for a grooved pulley 45 about which passes a hoisting cable 46 having one of its ends connected to a disk 47 which is supported by a helical spring 48 which, in turn, is supported upon a frame member 3. The other ends of the respective cables lead over guide-pulleys 49 to winding drums 50 mounted upon a transverse shaft 51. The bars 40 are furthermore connected for horizontal swinging movements by toggle devices comprising links 52 and $52^1$, (see Figs. 4, 5 and 7) whereof the link 52 of each pair is connected by a stud 53 with the associated bar and the other link $52^1$ extends through a sleeve 54 which is connected by a swivel pin 55 with the frame, as best shown in Fig. 7.

The link $52^1$ is screw-threaded to receive nuts 56 and $56^1$, the former serving to regulate the position of a washer 57 which receives the end thrust of an extensible spring 58 whose other end bears against the sleeve 54; while the nut $56^1$ acts to prevent the link being withdrawn from the sleeve.

The knuckle-pins 59 of the toggle devices for the jaws are connected by rods 60 with arms 61 provided upon the respective shafts 38. These shafts are coupled to be operated in unison by means of a rod 62 connecting arms 63 provided on the respective shafts, as shown in Fig. 4, and manipulated by means of a lever-handle 64 provided on one of the shafts.

When the referred to toggle devices occupy the positions such as indicated in Fig. 5, the bars 40, together with the jaw-bars 42 attached thereto, are held in their outer positions to enable the same to be moved with the vehicle to opposite sides of the material, as L (Fig. 4) which is to be conveyed by the latter. The material, when in the nature of lumber, bars, or the like, is desirably placed upon blocks, such as K, having recesses at their ends to afford shoulders, as S, under which the jaw-flanges 43 are carried through the instrumentality of the lever 64, shafts 38, rod 62 and arms 63 so that the rods 60 will cause the toggle devices to be moved into the positions shown in Fig. 4. When thus affected, the toggle links have been brought slightly above their axially alined positions, whereat they are yieldingly held through the office of the springs 58. Another office of the springs is to yieldingly hold the toggle devices in the positions shown in Fig. 5. The springs accordingly provide means to retain the jaws in engaged or disengaged positions with respect to the material or load and which obtains until sufficient power is applied to the lever 64 to overcome the power of the springs to enable the toggle-links being swung across alined positions. When the material is engaged by the grappling devices it is raised with the bars 42 by winding the hoisting cables upon the drums 50, which are actuated by power mechanism to be presently described, so as to be clear of obstructions in the path of the vehicle.

As before mentioned, the traction wheels 10 are driven by sprocket chains from shafts 35 and $35^1$ and the hoisting cables for the load-gripping bars 42 are operated by drums 50 mounted upon the shaft 51.

Referring now to Fig. 8, 66 represents a sprocket wheel on the motor for a power transmission chain 67 extending therefrom to a sprocket wheel 68 which is mounted for rotation upon a sleeve 69 mounted for independent rotary motion on the drum-shaft 51. The chain-driven wheel 68 has the inner peripheries of its rim machined to afford gripping surfaces $68^1$ for clutch elements 70 and 71. Said clutch elements are respectively provided with hubs $70^1$ and $71^1$ formed with circumferential grooves which serve as journals in bearing boxes 72 and are prevented from axial movements by the shoulders 73 being juxtaposed with the ends of said bearings. The sprocket wheel 68 which serves as the complementary clutch element for each of the elements 70 and 71, is movable endwise with the sleeve 69 by means of a bell-crank lever 74 having a forked arm $74^1$ engaging studs provided on a ring 75 which is seated in a peripheral groove formed in said sleeve. The other arm of lever 74 is connected by a rod 76 with an arm 77 on a rocker shaft, indicated by broken lines $77^1$, Fig. 1, and which is actuated by an operating handle 78.

The hub $70^1$ is provided with spur teeth $70^2$ and constitutes a pinion with respect to a toothed gear 79 secured to the casing $36^1$ of the aforesaid differential gear mechanism, so that when the clutch element 70 is coupled with the wheel 68 the shafts 35 and $35^1$ will be driven by the motor to propel the vehicle. The hub $71^1$ of element 71, like the hub of the element 70, is provided with gear teeth 80 for rotating a gear wheel 81 which is rotatable upon the shaft $35^1$. Gear-wheel 81 is secured to or made integral with a pinion 82 which drives a gear-wheel 83 which is keyed or otherwise rigidly secured to shaft 51 whereby the latter is rotated for winding the hoisting cables 46 upon the drums 50 when the clutch element 71 is rendered operative. The train of gears just described are proportioned to give a proper speed reduction to the drum shaft 51.

84 represents a brake band adapted to engage in a peripheral bearing $50^1$ provided, desirably, on one of the drums 50 for releasably holding the drums against unwinding movements. Said brake band may be operated from a lever handle 85 through the medium of any suitable or well-known devices.

As illustrated in Figs. 1 and 2, I provide oppositely disposed seats 86 and $86^1$ to the rear and in front of the steering wheels and the handle bars which are utilized for operating the aforedescribed clutch mechanism and brake devices, so that these agencies may be conveniently regulated from either seat and allow the operator to face the direction of the machine's travel.

In operation, the vehicle is moved over the material which is to be transported; the grappling devices are then rendered operative, as described, to engage the material, whereupon the clutch element 68 is engaged with the element 71 resulting in the shaft 51 being actuated to rotate the drums to elevate the material or load. When thus raised, the load is held suspended by utilizing the brake-band 75 and thereby prevent the hoisting cables being unwound from the drums. The clutch element 68 is then disengaged from element 71 and engaged with the element 70, resulting in the shafts 35 and $35^1$ being driven to propel the vehicle. The vehicle is guided in its travel by the operator controlling the front wheels 13 through the medium of the steering post 31. In the travel of the vehicle, the wheels 13 accommodate themselves to any inequalities in the path by the raising or lowering of the wheels in opposition to the power of the springs 18 and subject to the influence of the equalizer 24. When the vehicle reaches the place where the load is to be carried, and is deposited by releasing the brake, and when thus deposited the grappling devices are disengaged from the load, as before explained.

What I claim, is—

1. In a motor truck, the combination with a vehicle-frame of substantially the shape of an inverted U in transverse section, traction-wheels rotatable in bearing boxes rigidly secured to the rear end of the side members of said frame, and supporting and steering wheels at the forward end of the frame and arranged for independent vertical movements relative to the vehicle frame.

2. In a motor-truck, the combination with a vehicle-body having a frame comprising longitudinal girder members and transverse beam members rigidly secured adjacent to the forward and rear ends of said girder members, the latter being of greater depths than the beam-members and extending below the undersides of the same to afford a body of substantially an inverted U-shape in cross section, of traction wheels supporting the rear end of said body and supporting and steering wheels for the forward end of the body, said wheels being disposed at opposite sides of the vehicle to enable the vehicle to carry a load whose forward end will be in advance of the forward wheels and whose rear end will extend a distance behind the rear wheels.

3. In a motor-truck, the combination with the vehicle-body, of steering and body-supporting wheels, a transversely arranged equalizer bar pivotally connected intermediate its length to said body, and yieldable connections between the last-named wheels and the ends of the equalizer-bar.

4. In a motor-truck, the combination with the vehicle-body, traction wheels having individual axles, journal-bearings therefor in the vehicle-body, and means for driving said traction wheels, of steering and body-supporting wheels, a transversely arranged equalizer-bar pivotally connected intermediate its length to said body, and yieldable connections between the last-named wheels and the ends of the equalizer-bar.

5. In a motor-truck, the combination with a vehicle frame of an inverted U-shape in transverse section and constituted of girder members positioned upon its opposite sides and a plurality of transverse beam members connected to said girder members to retain the latter in spaced relations, axles carried by the lower ends of the said respective girder members, traction wheels on said axles, and steering wheels provided below the respective girder members, of a motor carried upon said frame and operative connections between the motor and each of said traction wheels.

6. In a motor-truck, a vehicle frame of substantially the shape of an inverted U in transverse section, said frame comprising spaced girder members, and transverse beam members connecting the upper ends of the girder members, a steering and frame supporting wheel positioned below the forward end of each of said girder members, and traction wheels extending into the girder members at the rear ends thereof.

7. In a motor-truck, a vehicle frame of substantially the shape of an inverted U in transverse section, said frame comprising spaced girder members, and transverse beam members connecting the upper ends of the girder members, a steering and frame supporting wheel positioned below the forward end of each of said girder members, traction wheels extending into the girder members at the rear ends thereof, and power driven means extending downwardly in each such girder member for driving the respective traction wheels.

8. In a motor-truck having a frame of substantially an inverted U-shape, a traction wheel for each of the side members of said frame, a motor carried by the frame in superposed relations with respect to said wheels, and operative connections including power transmission devices extending downwardly in each of said frame members for driving the respective wheels.

Signed at Seattle, Wash., this 4th day of May, 1914.

HARRY B. ROSS.

Witnesses:
PIERRE BARNES,
E. PETERSON.